F. TWYMAN.
PROJECTION APPARATUS FOR GAUGING ARTICLES.
APPLICATION FILED MAR. 19, 1921.

1,421,042.

Patented June 27, 1922.

5 SHEETS—SHEET 1.

Inventor:
Frank Twyman
By his Attorneys,
Baldwin + Wight

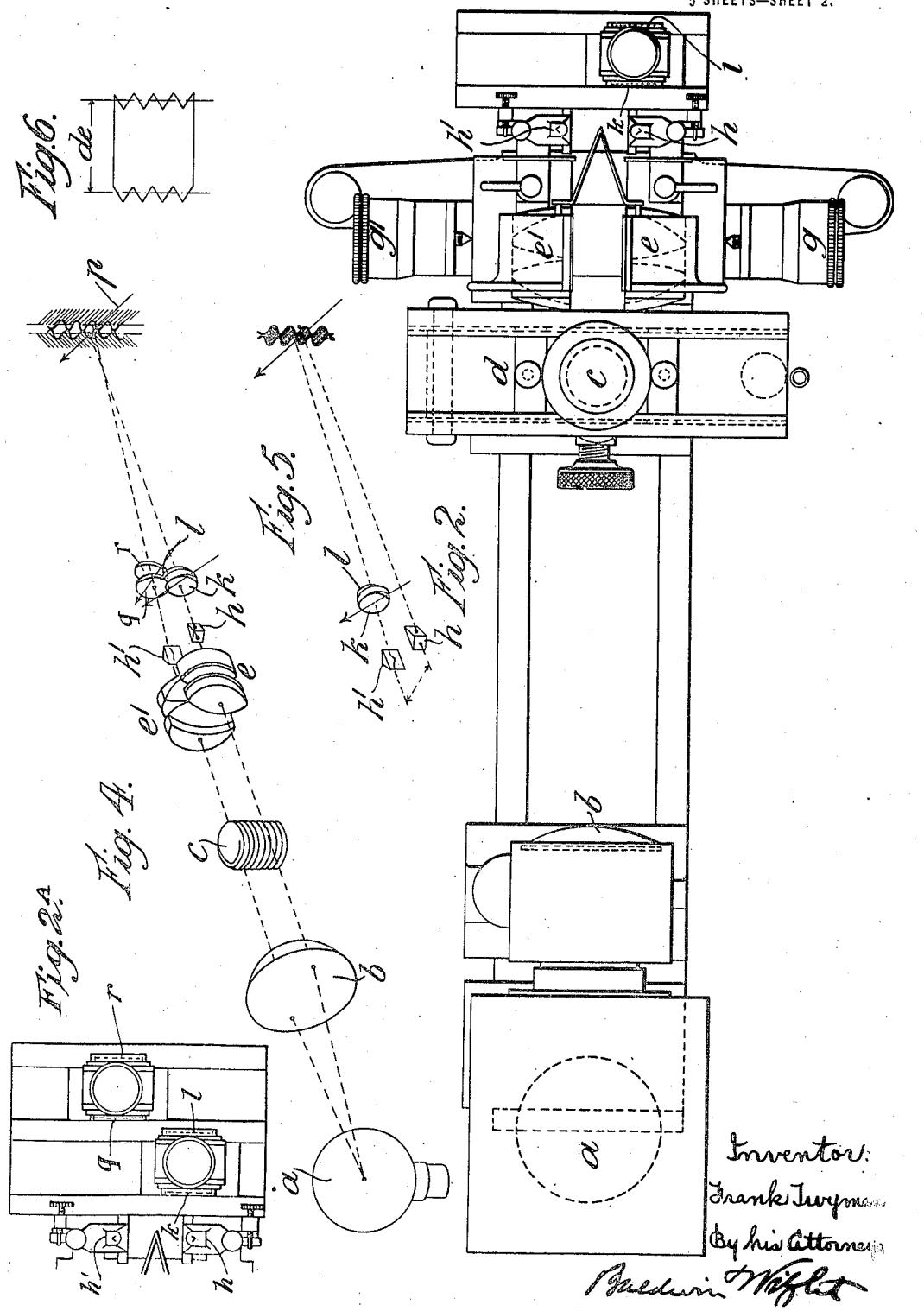

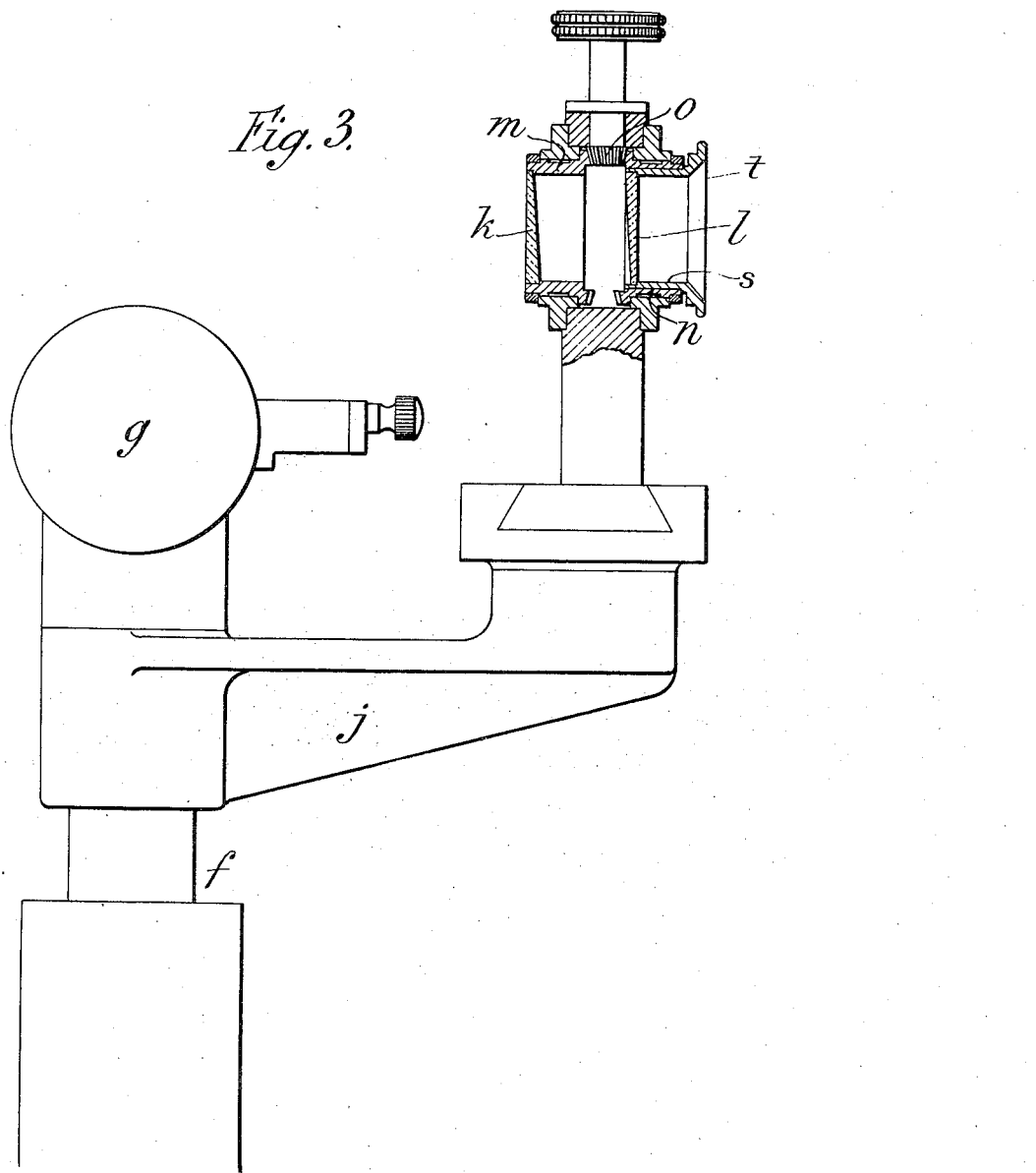

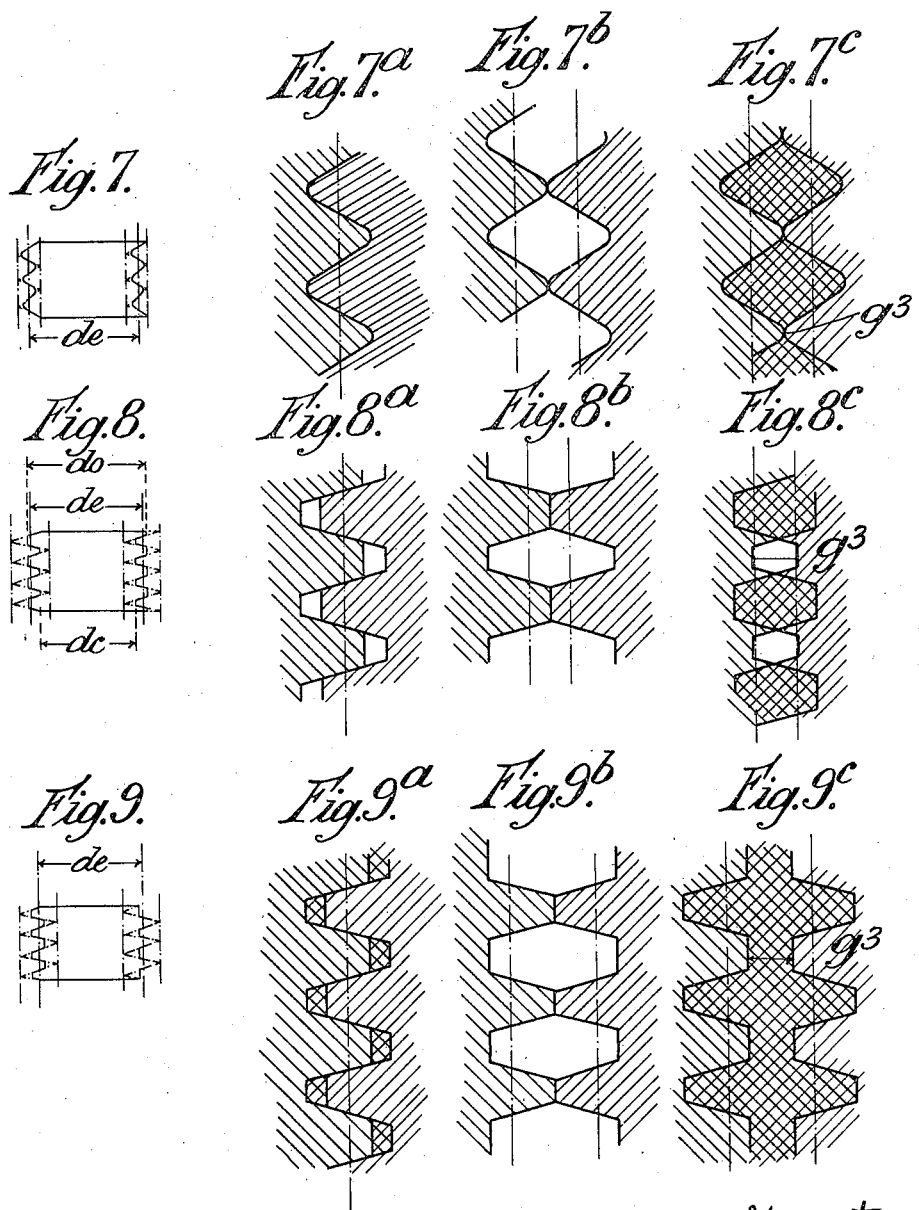

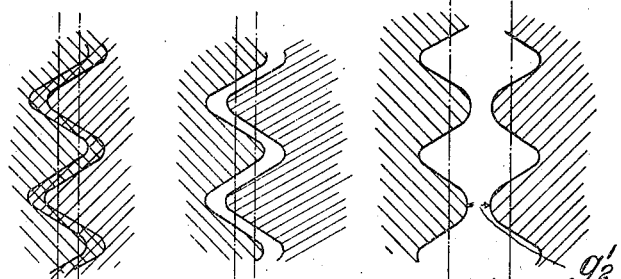
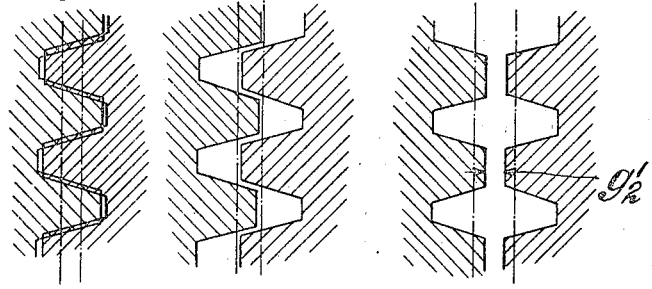
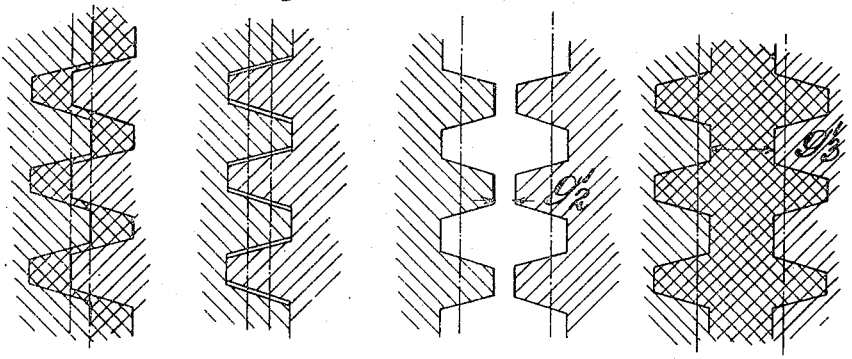

UNITED STATES PATENT OFFICE.

FRANK TWYMAN, OF LONDON, ENGLAND, ASSIGNOR TO ADAM HILGER, LIMITED, OF LONDON, ENGLAND.

PROJECTION APPARATUS FOR GAUGING ARTICLES.

1,421,042.  Specification of Letters Patent. Patented June 27, 1922.

Application filed March 19, 1921. Serial No. 453,583.

*To all whom it may concern:*

Be it known that I, FRANK TWYMAN, a subject of the King of Great Britain, residing at 75ᵃ Camden Road, London, England, have invented new and useful Improvements in Projection Apparatus for Gauging Articles, of which the following is a specification.

This invention relates to projection apparatus of the type described in the specification of the British patent by Reginald Page Wilson, No. 142517, and has for its object to provide means whereby the outside and core diameters of a screw thread can be gauged.

According to this invention the outside diameter of a screw thread is gauged by deflecting the beam of light which forms the image of one side of the thread so that the image of the top of the crest of one screw thread is contiguous with the image of the top of the crest of the thread 180° away, the tops of the images pointing in opposite directions; and the core diameter is gauged by deflecting the beam which forms the image of one side of the thread so that the image of the bottom of one core is coincident with the image of the bottom of the core 180° away.

An apparatus for carrying out this invention consists of a system of lenses and prisms as described in the above mentioned specification, and two prisms which are placed together in reverse positions and are capable of rotation through equal angles in opposite directions and the prisms are mounted on an axis parallel to the beam of light illuminating the object to be tested and means are provided for turning one prism relatively to the other.

The drawings illustrate an apparatus made in accordance with this invention.

Figure 1:
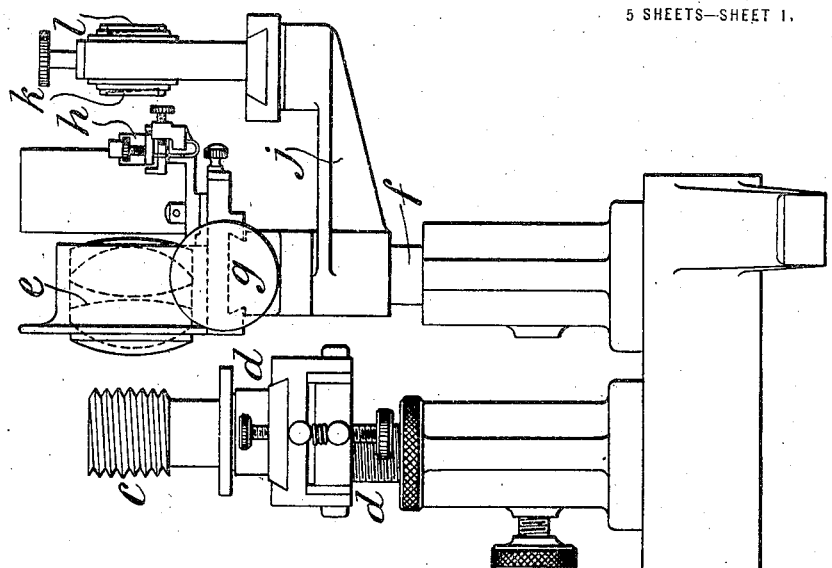
Figure 1:
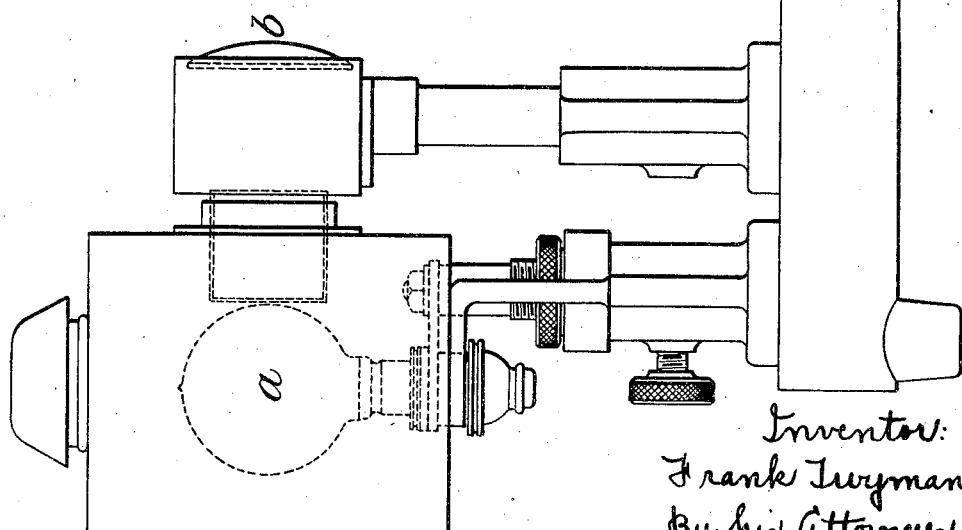

Figure 1 is an elevation and Figure 2 a plan. Figure 2ᵃ is a detail view showing the arrangement of the two systems of lenses.

Figure 3 is an elevation partly in section of the attachment made in accordance with this invention. Figures 4 and 5 are diagrams showing the paths of the beams of light. Figures 6, 7, 8 and 9 to Figures 7ᵍ, 8ᵍ and 9ᵍ are diagrams showing the images of the screw threads.

$a$ is a source of light located at the focus of a lens $b$ so that a parallel beam is provided to illuminate the screw thread $c$ carried in an adjustable socket $d$. Two achromatic lens systems $e\ e'$ are carried by a support $f$ and their positions are adjusted by micrometer drums $g\ g'$. Prisms $h\ h'$ are also carried by the support $f$. On an arm $j$ carried by the support $f$ are two prisms $k\ l$ placed in reverse positions as will be seen in Figure 3. The prisms $k$ and $l$ are mounted in sockets $m$ and $n$ which can be turned about their common horizontal axis in opposite directions by means of a bevelled pinion $o$ and the prism $l$ is in addition so mounted in its socket $n$ that it can be turned relatively to the prism $k$ independently of the bevelled pinion $o$. As clearly shown in Figure 3, the lens $l$ is mounted in a supplemental socket $s$ that fits within the socket $n$, and said supplemental socket $s$ can be turned by means of its outer rim $t$.

As is shown in the diagrams 4 and 5, the parallel beam of light illuminates the screw thread of the screw $c$, part of the beam passing through the lenses $e$ and prism $h$ and another part passing through the lenses $e'$ and prisms $h'$, whereby the image of the right hand side of the screw falls on the left hand side of the screen and that of the left hand side of the screw on the right hand side of the screen; each image being also reversed by the prisms $h$ and $h'$ so that the two thread images intermesh.

Referring to the diagrams Figure 6 shows a screw thread having straight flanks which form a pointed crest and core. In practice such a thread is not used, the crests and cores being rounded off or otherwise truncated, but whatever the shape of the crest and core, the effective diameter $d_e$ is the mean of the outside and core diameters obtained by continuing the straight flanks to form pointed crests and cores.

The types of thread referred to are:—

1. Those in which the truncation of crest and core are the same (Figure 7) as in the Whitworth thread.

2. Those in which the truncation of the crest is greater than that of the core (Figure 8) as in the Acme thread.

3. Those in which the truncation of the crest is less than that of the core (Figure 9) as in a tap designed to produce a screwed hole with a clearance for the top of the threads intended to fit therein.

In type 1 the effective diameter is the mean between the core and outside diameters, but in types 2 and 3 it is not so.

In using the apparatus a standard screw is placed in the socket $d$ and the prisms $k$ and $l$ in their mount are pushed out of the path of the beam. The images of the contours of the screw thread are focused on a screen and by means of the prisms $h$ and $h'$ the images are adjusted so that the flanks of the teeth in the two images exactly coincide, as is shown in Figures $7^a$, $8^a$ and $9^a$ which are the positions when the instrument is set for checking effective diameters.

The gap shown in Figure $8^a$ and the overlap shown in Figure $9^a$ have measurements corresponding with the specification of the standard thread of the type being measured, the gap being given by the formula:—gap shown by the standard thread=

$$m\left(d_e - \frac{d_c + d_o}{2}\right)$$

where $m$=the magnification of the image,
$d_e$=the effective diameter of perfect thread of the class
$d_c$=the core diameter of perfect thread of the class
$d_o$=the outside diameter of perfect thread of the class.

If the expression is positive, there will be a gap, and if negative an overlap in the projected image.

The magnification of the image on the screen will depend on the distance of the screen, and the focal length of the projection lenses. The magnification of the system is however most easily determined by projecting on the screen with either lens a plug gauge of known small diameter, and measuring the magnified image on the screen. The ratio of the diameter of the projected image to that of the plug gauge is the magnification $m$.

The prisms $k$ and $l$ are then pushed in their mount into the path of the beam passing through the lenses $e$ and prism $h$, and the prisms $k$ and $l$ are adjusted so that the image of the top of the crest of one screw thread is contiguous with the top of the crest of the thread 180° away, the tops of the images pointing in opposite directions, this being effected by moving the image of one crest in a direction indicated by the arrow $p$ in the diagram Figure 4.

The means of adjustment of the prisms $k$ and $l$ described above, (viz., their simultaneous movement by means of the bevel wheel $o$ and the independent movement of the prism $l$) enable this adjustment of contiguity of the crests of the thread image to be easily effected.

The images in the three types of screw are shown in Figures $7^b$, $8^b$ or $9^b$. If the prisms $k$ and $l$ are now pushed (without other readjustment) into the path of the beam passing the lenses $e'$ and prism $h'$, the images on the screen are as shown in Figures $7^c$, $8^c$ and $9^c$, as the case may be.

*The method of testing screws.*—The apparatus is now ready for testing screws in comparison with the standard, in the following way:—

A screw to be tested is substituted for the standard one and the prisms $k$ and $l$ in their mount are pushed out of the path of both beams. If the effective diameter is correct, the flanks of the thread images on the screen will be exactly contiguous as in Figure $7^a$, $8^a$ or $9^a$. If the effective diameter be too great, the images will be as in Figures $7^d$, $8^d$ or $9^d$, and if the effective diameter be too small, the images will be as in Figures $7^e$, $8^e$ or $9^e$. The test is so far carried out in the apparatus described in the British specification No. 142517.

The prisms $k$ and $l$ are then pushed into the beam passing through the lens (Figure 4) and the gap or overlap of the crests of the threads, shown in Figures $7^f$, $8^f$ or $9^f$, is measured and indicated by $g^1_2$. The apparatus is set so that the corresponding dimension in the case of the standard thread is zero.

Finally the prisms $k$ and $l$ are pushed into the beam passing through the lens $e'$ (Figure 5) and the gap or overlap of the core of the thread as shown in Figures $7^g$, $8^g$ or $9^g$, is measured and indicated by $g^1_3$.

Let the corresponding dimension in the case of the standard thread be $g_3$. In each case a gap should be considered positive and an overlap negative, in order that the following algebraic expressions may be universally applicable. Furthermore, the quantities $g^1_2$, $g^1_3$, $g_3$, are assumed to be measured on such a scale that they give measurements corresponding to the actual dimension of the thread, this being achieved by determining the magnification by projecting a plug gauge on the screen as described above.

Let $d_e$, $d_o$ and $d_c$ be respectively effective, outside and core diameters of the standard screw thread, which are known from the specification.

Let $d^1_e$, $d^1_o$ and $d^1_c$ be the dimensions of the thread under test corresponding to $d_e$, $d_o$ and $d_c$.

Then we have the following relations:—

(i) $g^1_2 = d_o - d^1_o$, (i. e., the error in outside diameter).

(ii) $g^1_3 - g_3 = d_c - d^1_c$, (i. e., the error in core diameter).

$d^1_e$ is checked as shown above by that portion of the apparatus corresponding to No. 142517.

Should it be desired, it is easy to add to this apparatus an attachment whereby definite tolerances can be added to the diameter (as projected) of the standard gauges. Such attachment may consist of a deflector mount with deflecting prisms exactly similar to the prisms $k$ and $l$ and their mount, whereby any desired deviation in a horizontal direction may be given to either beam.

This second set of deflecting prisms $q$ and $r$ is shown in Figures 2 and 4.

The said mount may be engraved to show the deviation of the prisms, or if desired the amount of tolerance so represented.

Alternatively, such additional mount may be used to measure the amounts of the gaps $g^1{}_2$, $g^1{}_3$, $g_3$, (and hence the errors in outside and core diameters) or the error in the effective diameter.

For each orientation of the prism $l$, in its independent fitting, there is, on rotation of the two prisms by means of the pinion $o$ a different plane of deviation of a ray passing through the system of prisms $k$ and $l$. Thus, in carrying out the adjustment whereby the crests of the standard thread are brought into contiguity, it is very convenient first of all to rotate the prism $l$ until the direction of movement of the image on the screen is correct, and then to adjust the pinion $o$ until the actual amount of displacement of the image is correct.

A division with index may be engraved on the mount whereby the orientation of the prism $l$ can be set to the positions known to be correct for each type of standard thread.

Another mode of use of the apparatus which requires no standard thread may be employed, and in view of the great difficulty and expense of making standard thread gauges, this mode is very useful.

Three plug gauges are made representing the outside diameter, effective diameter and core diameter respectively of the thread to which the screws to be tested are desired to conform.

With the prisms $k$ and $l$ out of the field, the apparatus is set for testing effective diameter by means of the corresponding plug gauge, the latter being placed in the position normally occupied by the screw thread under test.

The plug gauge representing the outside diameter being put in position the prisms $k$ and $l$ are pushed into the beam passing through the lens $e$ and by adjusting the prisms $k$ and $l$ the two images are brought into contiguity, thus setting the apparatus for testing outside diameter. If the thread is of type 1, as illustrated in Figure 7, no further setting of the apparatus is necessary, and the screws can be immediately tested for effective, outside and core diameters by pushing the prisms $k$ and $l$ into the three positions, namely, out of the field, into one beam, and then into the other beam, respectively. If, however, the thread under consideration is of the second or third type, the screws are most conveniently first tested for outside and effective diameters, and the apparatus then adjusted by means of the third plug gauge to gauge the core diameter, the prisms $k$ and $l$ being pushed for that purpose into their third position, and the prisms so adjusted that neither gap nor overlap is shown on the screen.

What I claim is:—

1. In projection apparatus for gauging articles, a source of light, two lenses so located that part of the beam of light passes through each lens, two prisms one adjacent to each lens, and other prisms each of which is movably mounted to be placed in and out of the path of the beam passing through either lens and its prism.

2. In projection apparatus for gauging screw threads, a source of light, two lenses so located that part of the beam of light passes through each lens, two prisms one adjacent to each lens, and other prisms each of which is movably mounted so that it may be positioned to deflect the beam of light passing through either lens and its prism which forms the image of one side of the thread so that the image of the top of the crest of one screw thread is contiguous with the image of the top of the crest of the thread 180° away, the tops of the images pointing in opposite directions, said last-named prisms being adapted to be pushed into and out of the path of the beam passing through either lens.

3. In projection apparatus for gauging screw threads, a source of light, two lenses so located that part of the beam of light passes through each lens, two prisms one adjacent to each lens, other prisms adapted to deflect the beam of light which forms the image of one side of the thread so that the image of the top of the crest of one screw thread is contiguous with the image of the top of the crest of the thread 180° away, the tops of the images pointing in opposite directions, and other prisms adapted to cause the beam to deviate in a horizontal direction.

4. In projection apparatus for gauging articles, a source of light, two lenses so located that part of the beam of light passes through each lens, two prisms one adjacent to each lens, a system of prisms consisting of two prisms placed in reverse positions and other prisms adapted to be pushed into or out of the path of the beam passing through either lens.

5. In projection apparatus for gauging articles, a source of light, two lenses so located that part of the beam of light passes through each lens, two prisms one adjacent to each lens, a system of prisms consisting of two prisms placed in reverse positions, and means for rotating the prisms in the system so that the prisms are rotated through equal angles in opposite directions.

6. In projection apparatus for gauging articles, a source of light, two lenses so located that part of the beam of light passes through each lens, two prisms one adjacent to each lens, a system of prisms consisting of two prisms placed in reverse positions, means for placing the system of prisms in the path of the beam passing through either lens, and means for turning one prism of the system relatively to the other.

7. In projection apparatus for gauging screw threads, a source of light, a screen, optical means whereby the reversed image of the right hand side of the thread falls on the left hand side of the screen and the reversed image of the left hand side of the thread on the right hand side of the screen, and prisms adapted to deflect the beam of light which forms the image of one side of the thread so that the image of the top of the crest of one screw thread is contiguous with the top of the crest of the thread 180° away, the tops of the images pointing in opposite directions.

8. In projection apparatus for gauging screw threads, a source of light, a screen, optical means whereby the reversed image of the right hand side of the thread falls on the left hand side of the screen and the reversed image of the left hand side of the thread on the right hand side of the screen, prisms adapted to deflect the beam of light which forms the image of one side of the thread so that the image of the top of the crest of one screw thread is contiguous with the top of the crest of the thread 180° away, the tops of the images pointing in opposite directions, which prisms are adapted to be pushed into or out of the path of the beam passing through either lens, and other prisms adapted to cause the beam to deviate in a horizontal direction.

9. In projection apparatus for gauging articles, a source of light, a screen, optical means whereby the reversed image of the right hand side of the article falls on the left hand side of the screen and the reversed image of the left hand side of the article on the right hand side of the screen, two prisms placed in reverse positions and movably mounted to be positioned as a unit in the path of either beam, and means for rotating the prisms through equal angles in opposite directions.

In testimony that I claim the foregoing as my invention I have signed my name this 25" day of February, 1921.

FRANK TWYMAN.